United States Patent
Garg

(10) Patent No.: US 7,643,464 B2
(45) Date of Patent: Jan. 5, 2010

(54) WLAN SCHEDULER

(75) Inventor: Parag Garg, Sunnyvale, CA (US)

(73) Assignee: NXP B.V., Eindhoven (NL)

(*) Notice: Subject to any disclaimer, the term of this patent is extended or adjusted under 35 U.S.C. 154(b) by 0 days.

(21) Appl. No.: 10/555,554

(22) PCT Filed: May 6, 2004

(86) PCT No.: PCT/ID2004/001422

§ 371 (c)(1),
(2), (4) Date: Mar. 14, 2007

(87) PCT Pub. No.: WO2004/100467

PCT Pub. Date: Nov. 18, 2004

(65) Prior Publication Data

US 2007/0263635 A1 Nov. 15, 2007

Related U.S. Application Data

(60) Provisional application No. 60/469,584, filed on May 9, 2003.

(51) Int. Cl.
*H04B 7/212* (2006.01)
(52) U.S. Cl. ...................... 370/348; 370/332; 370/346; 370/347; 370/431; 370/395.4; 370/395.41; 370/395.42; 370/443; 455/450; 455/452.1; 455/452.2; 709/227; 709/228; 709/229
(58) Field of Classification Search ......... 455/450–455; 370/322, 329, 431, 433–449, 462; 709/226–229, 709/203, 208–211
See application file for complete search history.

(56) References Cited

U.S. PATENT DOCUMENTS

| | | | | |
|---|---|---|---|---|
| 6,141,336 A | * | 10/2000 | Bauchot et al. | 370/348 |
| 7,165,252 B1 | * | 1/2007 | Xu | 718/102 |
| 2002/0165754 A1 | * | 11/2002 | Tang et al. | 705/9 |
| 2003/0223365 A1 | * | 12/2003 | Kowalski | 370/230.1 |
| 2004/0081095 A1 | * | 4/2004 | Liu et al. | 370/230.1 |
| 2004/0128589 A1 | * | 7/2004 | Lewis | 714/700 |
| 2004/0160930 A1 | * | 8/2004 | Choi et al. | 370/338 |
| 2006/0014492 A1 | * | 1/2006 | Del Prado Pavon et al. | 455/41.2 |
| 2007/0211749 A1 | * | 9/2007 | Benveniste | |

FOREIGN PATENT DOCUMENTS

EP 1309139 * 5/2003
EP 1309139 A1 * 5/2003

OTHER PUBLICATIONS

Part 11: Wireless Lan Medium Access Control (MAC) and Physical Layer (PHY) specifications Amendment 8: Medium Access Control (MAC) Quality of Service Enhancements IEEE, Nov. 11, 2005—Approved Sep. 22, 2005.*

* cited by examiner

*Primary Examiner*—Lester Kincaid
*Assistant Examiner*—Mehmood B Khan

(57) ABSTRACT

A system comprises a plurality of wireless stations for exchanging data over a wireless network and a coordinator station such an access point. The coordinator station receives a request for a traffic specification from one of the wireless stations. The traffic request comprises a traffic parameter (202) representative of the traffic specification. The coordinator station runs an acceptance algorithm (226) to determine if the request can be met based on the parameter and a current traffic schedule based on other previously granted traffic requests (228). If the new request can be accommodated, a traffic scheduler thereafter generates a new traffic schedule (232, 234) using the Cyclic Executive Model (230).

13 Claims, 2 Drawing Sheets

WLAN SCHEDULER

CROSS REFERENCE TO RELATED APPLICATION

This application claims the benefit of U.S. provisional Ser. No. 60/469,584 filed 09 May 2003, which is incorporated herein whole by reference.

BACKGROUND OF THE INVENTION

1. Field of the Invention

The invention relates to the field of wireless local area networks and proposes systems and methods for scheduling traffic over a local area network. The invention is particularly relevant to wireless local area networks where traffic is categorized and where priorities are given to traffic categories based on respective associated timing constraints. The invention is further relevant to wireless systems operating according to the IEEE 802.11e specification.

2. Description of the Related Art

Personal computers (PC) and traditional consumer electronic (CE) devices such as set-top boxes, television sets, sound systems and the like are slowly converging and both PCs and CE devices now offer functionalities that tend to satisfy customers' needs in similar ways. Wireless technologies provide this link between the two areas of expertise and CE manufacturers are working on bringing the PC content to the living room and/or, vice versa, on bringing living room content such as TV programs to the user's PC. A major concern with wireless communication is however to ensure data delivery over an unreliable and crowded environment. In addition, some traditional problems, e.g. delays, interferences, losses, encountered over wireless mediums when transmitting non-multimedia data such as text files or emails are only exacerbated when dealing with multimedia content. Indeed, multimedia content does not tolerate packet losses or delays and IEEE 802.11e seeks to solve this issue by defining quality of service for data transmission over WLANs. In order to do that, IEEE 802.11e introduces traffic prioritizing, traffic negotiation and traffic scheduling.

The basic architecture in a wireless local area network as defined in IEEE 802.11 is a basic service set (BSS). A BSS is a set of stations that can communicate with one another directly as it is done in independent basic service sets, or via an access point, as done in infrastructure basic service sets. Stations can transfer data following one of several access mechanisms. A first access mechanism is known as carrier sense multiple access with collision avoidance (CSMA/CA) according to which a station senses the wireless medium before beginning a transmission. The station can either use a physical carrier sensing mechanism or, preferably, the station can use a virtual carrier sensing mechanism as provided in the IEEE 802.11 specification with the network allocation vector (NAV). Such access mechanism is also referred to as the distributed coordination function (DCF), which is a contention based channel access that all stations use when they compete for the medium. A second access mechanism is a centrally controlled one that uses a poll and response protocol to avoid collision and contention. This access mechanism is also called the Point Coordination Function and is managed by a Point Coordinator (PC) usually located in an access point (AP). Stations transmit requests to the PC that logs the requests in a polling list and polls the stations one after another for traffic while also delivering traffic to them. The PCF is the preferred access mechanism when time-sensitive multimedia content is transmitted over a crowded environment. The PCF may be used together with the distributed coordination function (DCF). To this end, the Point Coordinator has a timing advantage over other stations in the BSS in taking over the medium and, once the Point Coordinator has gained access to the medium, it may then negotiate and control the transmission of time-sensitive data, e.g. content streaming, from one station to another.

The IEEE 802.11e lays down the basis for traffic categorizing and traffic controls and how traffic is actually scheduled is left to the manufacturer's choice. There is therefore a need for a reliable and efficient scheduling scheme.

SUMMARY OF THE INVENTION

To solve the aforementioned requirements, a traffic schedule mechanism is proposed by the invention.

A method for scheduling traffic over a wireless local area network composed of at least a coordinator station and one or more wireless stations is contemplated. First, a request for traffic is received at the coordinator station. The request is issued by one of the wireless stations and comprises a traffic parameter representative of the traffic that the station is requesting. A traffic request acceptance algorithm is then carried out based on the set of parameters and other traffic requests previously received. If the request can be accommodated, a new traffic schedule is generated that includes the new request. The new schedule is generated using the Cyclic Executive Model.

A schedule mechanism of the invention is based on a well-proven model: the Cyclic Executive Model described in "The Cyclic Executive Model and Ada" by T. P. Baker and Alan Shaw, IEEE 1998, hereby incorporated by reference. Using this model, the inventor has realized that traffic in a real-time wireless local area network could be made periodic without departing from the prevalent goal of traffic scheduling, namely reliable delivery of data. The Executive Cyclic Model proposes to execute a traffic schedule repeatedly in a regular cyclic pattern and the traffic schedule can be recomputed when a new traffic specification from one of the stations of the BSS needs to be taken into account. Actions in the Executive Model, or traffic requests in the invention, are represented by triples that include characteristics of the action, that is its execution time which is the time required to execute the action, the period which is the duration of the time interval between the possible start of on execution and that of the next, and the deadline for completion of the action. The IEEE 802.11 specification defines semantics and structures of traffic requests which comprise a traffic specification or a set of parameters representative of the data transfer, e.g. type of data transfer, timing constraints, size and requested duration. Triples for the purpose of the Cyclic Execution Model algorithm may be generated from these sets of parameters describing traffics. Thus, in an embodiment of the invention, a triple is generated for each traffic request from this set of parameters included in the request and representing the traffic. The Cyclic Executive Model then permits to interleave all traffic requests and derives the schedule from the triples representative of these requests. The traffic schedule as derived will enable to, execute all requested and accepted traffic requests within their periods and deadlines as defined in the respective triples. An advantage of the invention is to propose a reliable and easily implementable scheduler using a periodic model widely applied to real-time computing processes.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION

The invention pertains to a scheduler for managing transfers of data amongst stations so that data transfers with stringent timing requirements are being given a higher priority over other scheduled traffics to avoid delays and content transfer interruption. The invention will be illustrated in the framework of the IEEE 802.11e WLAN QoS specification, however the invention could be used to schedule traffic over networks based on other wireless or wireline technologies. It is to be noted that the invention is specifically illustrated in light of the IEEE 802.11e specification incorporated herein by reference and definitions and acronyms of technical terms used in the specification are assumed to be known and will not be repeated. Reference is made to the specification if clarification is needed.

Figure 1:
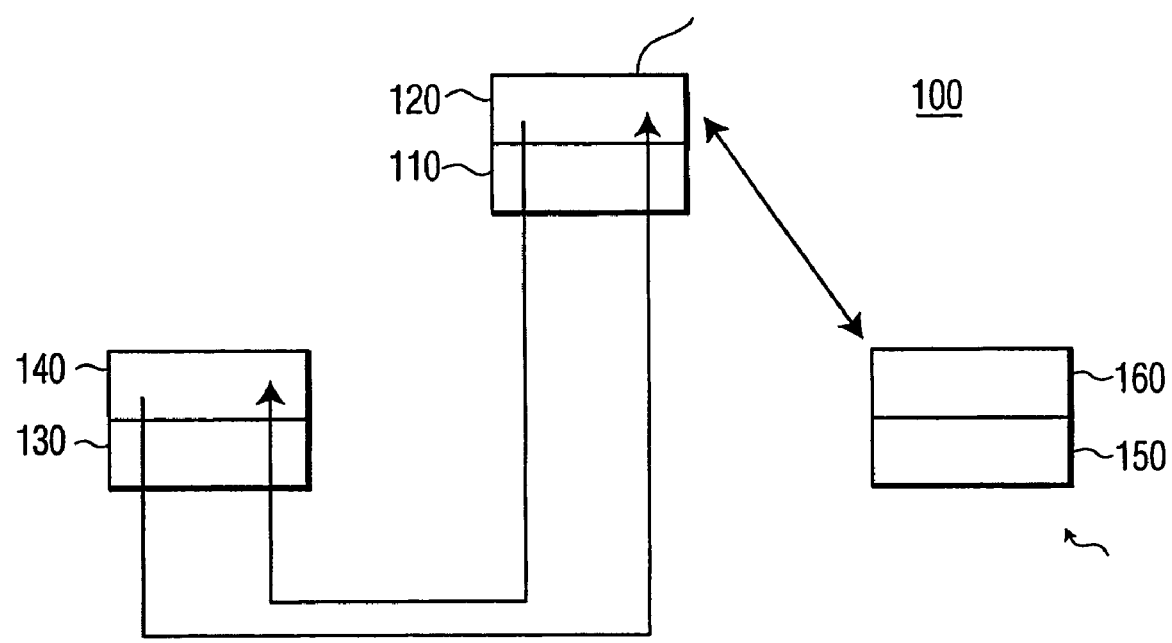
FIG. 1 shows a basic service set of the invention.

The invention is illustrated for a basic service set 100 (BSS) as shown in FIG. 1. BSS 100 comprises coordinator station AP and stations A, B and C. Coordinator station AP may be comprised in a conventional access point. Coordinator station AP and stations A, B and C comprise respective Medium Access Control (MAC) layer for communicating over the wireless medium and respective host layer for communicating with applications of the devices associated with the stations. Coordinator station AP comprises MAC 110 and host 120, station A comprises MAC 130 and host 140. Respective hosts and MACs of stations B and C are not shown here. Exchange of content and control data between station A and access point AP is carried out by exchange of frames between MAC 130 and MAC 110 as specified in the various extensions of the original IEEE 802.11 specification. The MAC layer in a given station handles the exchange of frames with other stations to ensure that data can be reliably delivered while also controlling the access to the shared wireless medium to ensure a fair access. The MAC may also provide additional security layers through different levels of encryption.

In this embodiment, coordinator station AP operates as a hybrid coordinator and implements the frame exchange sequence as defined by the hybrid coordination function. The hybrid coordination function combines and enhances the contention-based and polling based access methods mentioned above to provide stations A, B and C with prioritized and parameterized QoS access to the wireless medium while continuing to support non-QoS stations, if any, for best effort transfer. So-called prioritized traffic occurs during the contention period and so-called parameterized traffic occurs during the contention-free period. Stations A, B and C are QoS stations that implement the QoS facility and hybrid coordination function.

In this embodiment, station A has data queued for transmission to another station in BSS 100 and contacts coordinator station AP to get authorization to access the wireless medium. To this end, station A transmits a request for traffic REQ to coordinator station AP. Request REQ may correspond to a MLME-ADDTS.request and includes traffic specification parameters or TSPEC such as the source address, the destination address, the traffic characteristics, the traffic stream identifier (TSID) and QoS requirements for the traffic stream of concern. In response to the traffic request REQ, coordinator station AP transmits response RESP that indicates whether the traffic request REQ can be accommodated. As will be explained in details hereinafter, a previously traffic schedule maintained by the coordinator station AP may, as a consequence, be modified to accommodate the new traffic specification. The exchange of frames described in this paragraph may also take place when station A wishes to modify the parameters of a traffic specification previously granted by the coordinator station AP.

Figure 2:
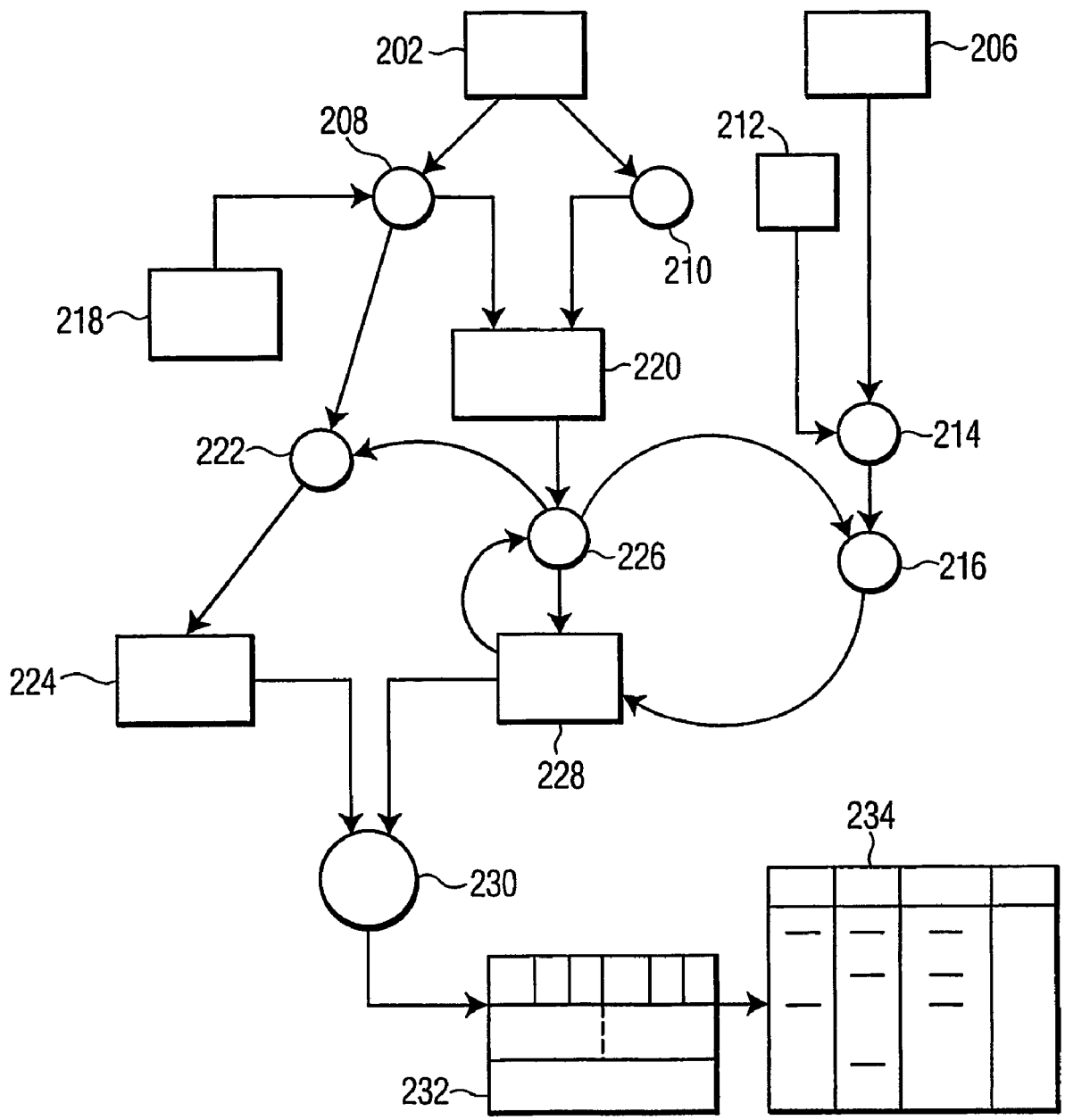
FIG. 2 shows a flow chart of a schedule mechanism of the invention.

FIG. 2 shows a flowchart diagram 200 of an exemplary traffic scheduling mechanism of the invention. Coordinator station AP first receives a new request for parameterized traffic from one of the stations A, B or C. The received request comprises traffic specification parameters 202. Parameters 202 include, for example, a priority, TSID, data size parameters and data rate parameters. In step 208, coordinator station AP calculates a requested service time T for the received traffic request on the basis of parameters 202 and QoS control elements 218. QoS control elements 218 are transmitted in the QoS control field of the MAC frame transmitted by station A, B or C and may include TID (traffic identifier) and TXOP duration and queue size. This calculated service time requested T is a first element of a triple generated for the Cyclic Executive Model and is associated with the new traffic specification. It must be noted that the service time T may also be derived so that it takes into account any protocol overhead such as the granting of a transmission opportunity, the protocol handshake, the IFS periods, the back-off timings, processing delays and similar delays.

Parameters 202 further include a traffic type, a minimum service interval, a maximum service interval and a delay bound, and in step 210, coordinator station AP further calculates on the basis of these additional parameters 202 a service period P and a deadline D.

Once triple (T,P,D) 220 has been calculated for the new traffic specification, an admission control module of the coordinator station AP runs an acceptance algorithm 226 to weigh in the possibility of adding the new traffic specification to the already existing traffic schedule. The admission control module checks how much time can be allocated to the requesting station based on the triple (T,P,D). The acceptance algorithm 226 is run on the basis of triple 220 and the previously admitted parameterized traffic specifications 228. If the new traffic specification is accepted, the admitted parameterized traffic specifications 228 is updated to include it.

Furthermore, if the new traffic specification is accepted, the relative duration of the time allocated to prioritized traffic may be adjusted to allow more time for parameterized traffic. In step 222, the portion of the frame allocated to prioritized traffic, which can be expressed in terms of percentage of the whole frame, may be adjusted based on the calculated service time requested T and a new duration 224, or percentage is derived therefrom.

In addition to these two alternatives to accommodate the new specification, the admission control module may also decide to delete or adjust a low priority TSPEC to free some time for the new high priority traffic.

Once the admitted parameterized traffic specifications list 228 has been updated and the duration of the prioritized traffic adjusted in 224, the coordinator station AP may generate a new traffic schedule 234 on the basis of the Cyclic Executive Model. A cyclic schedule specifies an interleaving of actions that will enable processes to execute within their periods and deadlines. It is divided into one or more major schedules which describe the sequence of actions to be performed during some fixed period of time, called the major cycle. The actions of a major schedule are executed cyclically, going back to the beginning at the start of each major cycle. Each major schedule is further divided into one or more minor schedules or frames. The length of a frame is then called the minor cycle of the system. In step 230, the new traffic schedule 234 is derived on the basis of the admitted prioritized traffic 224 and the listed admitted parameterized traffic 228. To this end, first a Gant Chart 232 is derived showing time-slices allocated to each admitted traffic specification. A station, e.g. station A in this embodiment, can be granted more than one time-slot for a specific traffic specification, e.g. time-slots A1 and A2 in FIG. 2 so that the traffic schedule can permit other stations to meet the respective deadlines D of their traffic specifications. The data frame that A needs to transmit is then split into two sets of data transmitted during different time-slots to enable stations B and C to transmit in the mean time. The traffic scheduling is thus made periodic with a minor cycle time mct and a major cycle time MCT of the Cyclic Executive Model, as shown in diagram 232.

Coordinator station AP may then be configured to generate a traffic schedule table 234. The time table 234 is obtained from the chart 232 and comprises the timing and indications as to the actions to be taken by the coordinator station AP. The actions may relate to the transmission of the beacon, parameterized traffic and prioritized traffic. As far as parameterized traffic is concerned, entries of the table 234 may indicate an address of the polled station, a CF-Poll starting time, a duration of the transmission opportunity that will be granted to the station and, possibly, remarks indicating the action to be taken by the coordinator station. A granted traffic specification may correspond to more than one entry in table 234, one for each time slot of the chart 232. Table 234 also comprises an entry associated with the beacon comprising its transmit time. Table 234 may not necessarily be an exact representation of the chart 232 and some optimization may be done to it. For instance, where adjacent time-slices are for the same station but for different traffic specifications, the coordinator station AP may regroup the two adjacent time-slots into one and one entry only is made in table 234. In this case, the coordinator station AP will only grant one transmission opportunity of greater duration instead of polling the same station twice. The polled station will be responsible for committing to both traffic specifications within the longer allocated time slot.

In parallel to the above-described steps, an inactivity timer 212 may be run to count inactivity intervals 206 of wireless stations in the BSS 100. An aging algorithm is carried out in step 214 and if it is determined that a specific station that was previously granted parameterized traffic does not use the allocated time slots, or partly uses them, the associated entry in the admitted parameterized traffic 228 can be erased or adjusted accordingly in step 216. Thus, for example, if a particular station A, B or C does not honor the granted TXOP and does not send data, the remaining TXOP is wasted and no change is done in the schedule. However, if the station consecutively wastes a number of TXOPs, the corresponding traffic specification is deleted as a whole in step 216 and deleted in the admitted traffic specifications 228. An aging algorithm module 214 controls timer 212, which measures the inactivity interval of the station. Module 214 resets and monitors timer 212. In another instance, a transmission opportunity TXOP granted to a station may not be sufficient to permit the station to transmit data.

What is claimed is:

1. A method for scheduling traffic in a wireless local area network (WLAN) comprising a coordinator station and a plurality of wireless stations, the method comprising:
   receiving, by the coordinator station, from one of the wireless stations on the WLAN, a new traffic request including traffic specification parameters;
   running a traffic request acceptance algorithm based on the traffic specification parameters and other previously received traffic requests;
   if the new traffic request is accepted, using a Cyclic Executive Model to generate a new periodic traffic schedule table with a minor cycle time and a major cycle time to reflect the new traffic request, wherein:
      the traffic schedule table comprises a plurality of entries corresponding to accepted traffic requests, each entry comprising an address of a polled station that will be granted a transmission opportunity and a time slot comprising a poll starting time and a variable duration, and
      at least two entries in the traffic schedule table correspond to the same traffic request.

2. The method of claim 1, further comprising:
   polling a station during a contention-free period as indicated in the new traffic schedule table by granting the station a transmission opportunity.

3. The method of claim 1, wherein the entry of the new traffic schedule table comprises a duration of a contention-free period or a duration of a contention period.

4. The method of claim 1, wherein the new traffic schedule table is determined from a current traffic schedule table derived from the other traffic requests previously received from other stations; and splitting, a particular traffic request into at least two entries.

5. A wireless local area network (WLAN) scheduler comprising:
   a receiver for receiving a traffic request for a traffic specification over a wireless local area network (WLAN) from a wireless station in the network, the traffic request comprising traffic parameters representative of the traffic specification;
   an acceptance control module configured to determine if the request can be accommodated based on the parameters and a previously determined traffic schedule table;
   a traffic scheduler configured for generating a new periodic traffic schedule table with a minor cycle time and a major cycle time from the parameters and the previously determined traffic schedule table using a Cyclic Executive Model, wherein:
      the traffic schedule table comprises a plurality of entries corresponding to accepted traffic requests, each entry comprising an address of a polled station that will be granted a transmission opportunity and a time slot comprising a poll starting time and a variable duration, and
      at least two entries in the traffic schedule table correspond to the same traffic request.

6. A system comprising:
   a plurality of wireless stations for exchanging data over a wireless local area network (WLAN);
   a coordinator station comprising:
      a receiver for receiving a request for a traffic specification from one of the wireless stations, the request comprising a traffic parameter representative of the traffic specification;

an acceptance control module configured to determine if the request can be accommodated based on the parameter and a previously determined traffic schedule;

a traffic scheduler configured to generate a new periodic traffic schedule with a minor cycle time and a major cycle time from the parameters and the previously determined traffic schedule using a Cyclic Executive Model, wherein:

the traffic schedule table comprises a plurality of entries corresponding to accepted traffic requests, each entry comprising an address of a polled station that will be granted a transmission opportunity and a time slot comprising a poll starting time and a variable duration, and at least two entries in the traffic schedule table correspond to the same traffic request.

7. The method according to claim 1, wherein said at least two entries that correspond to the same traffic request comprise two entries of different duration.

8. The method according to claim 7 wherein the two entries of different duration are adjacent each other.

9. The method according to claim 1, further comprising deleting an entry for a particular wireless station if no data is transmitted after no transmission occurs for a predetermined number of transmission opportunities (TXOP).

10. The method according to claim 1, wherein the traffic schedule table further comprises an entry associated with the coordinator station.

11. The method according to claim 1, wherein the new traffic request corresponds to at least two entries.

12. The method according to claim 1, wherein a previous traffic request corresponds to at least two entries.

13. The method according to claim 1, wherein each entry further comprises remarks indicating an action to be taken by the coordinator station.

* * * * *